US011004034B2

(12) United States Patent
Ward et al.

(10) Patent No.: US 11,004,034 B2
(45) Date of Patent: May 11, 2021

(54) INVENTORY MANAGEMENT SYSTEM

(71) Applicant: Laundris Corporation, Austin, TX (US)

(72) Inventors: Donald Ward, Austin, TX (US); Joey Dominguez, Austin, TX (US); Rob Garner, Garland, TX (US); Edward Casteel Milner, Dallas, TX (US); Jamar Beall, Euless, TX (US)

(73) Assignee: Laundris Corporation, Austin, TX (US)

( * ) Notice: Subject to any disclaimer, the term of this patent is extended or adjusted under 35 U.S.C. 154(b) by 0 days.

(21) Appl. No.: 16/783,416

(22) Filed: Feb. 6, 2020

(65) Prior Publication Data

US 2020/0250609 A1 Aug. 6, 2020

Related U.S. Application Data

(60) Provisional application No. 62/802,079, filed on Feb. 6, 2019.

(51) Int. Cl.

*G06Q 10/08* (2012.01)
*G06Q 50/12* (2012.01)

(Continued)

(52) U.S. Cl.

CPC ............. *G06Q 10/087* (2013.01); *G06N 3/08* (2013.01); *G06Q 30/0202* (2013.01); *G06Q 30/0633* (2013.01); *G06Q 50/12* (2013.01)

(58) Field of Classification Search

CPC ............................. G06Q 10/087; G06Q 10/02

See application file for complete search history.

(56) References Cited

U.S. PATENT DOCUMENTS 5,255,184 A * 10/1993 Hornick ............... G06Q 10/025 705/6
5,926,799 A * 7/1999 Robinson ............... G06Q 10/02 705/28

(Continued)

FOREIGN PATENT DOCUMENTS

CN 108416602 A 8/2018
CN 208110663 U 11/2018

(Continued)

OTHER PUBLICATIONS

Julie Hall, AAA Honors Top Hotels for Cleanliness and Condition, AAA NewsRoom, Jul. 31, 2019, [online], [retrieved on Nov. 26, 2019]. Retrieved from the Internet <https://newsroom.aaa.com/2019/07/aaa-honors-top-hotels-cleanliness-condition/>.

(Continued)

*Primary Examiner* — Florian M Zeender
*Assistant Examiner* — Vanessa Deligi
(74) *Attorney, Agent, or Firm* — Craige Thompson; Thompson Patent Law

(57) ABSTRACT

Apparatus and associated methods relate to an inventory management system having a machine learning engine trained to (a) dynamically predict a demand amount of the inventory in response to a set of near-future data and (b) generate a signal to order the amount of inventory as needed. In an illustrative example, the machine learning engine may be trained by a hotel's historical room booking data, the hotel's historical occupancy data, and corresponding inventory consumption data stored in a database. Various embodiments may enable, for example, the hotel to have better management on the status of inventories at various stages. For example, sufficient inventory may be available. In addition, providing the proper amount of inventory may also advantageously reduce the cost spent on unused products.

17 Claims, 4 Drawing Sheets

(51) Int. Cl.

| | |
|---|---|
| ***G06N 3/08*** | (2006.01) |
| ***G06Q 30/06*** | (2012.01) |
| ***G06Q 30/02*** | (2012.01) |

(56) References Cited

U.S. PATENT DOCUMENTS

| | | | | |
|---|---|---|---|---|
| 6,974,079 | B1 * | 12/2005 | Strothmann | G06Q 10/02 235/380 |
| 8,229,801 | B2 * | 7/2012 | Eisenberg | G06Q 10/087 705/28 |
| 10,373,116 | B2 | 8/2019 | Medina et al. | |
| 10,373,117 | B1 * | 8/2019 | Sadighian | G06Q 10/0875 |
| 2003/0126103 | A1 * | 7/2003 | Chen | G06Q 10/06 706/50 |
| 2003/0130899 | A1 * | 7/2003 | Ferguson | G06Q 30/06 705/26.1 |
| 2009/0118002 | A1 * | 5/2009 | Lyons | G06Q 30/0255 463/29 |
| 2012/0249307 | A1 * | 10/2012 | Eisenberg | G08B 13/2462 340/10.1 |
| 2016/0180256 | A1 * | 6/2016 | Renaud | G06Q 30/0202 705/5 |
| 2016/0342936 | A1 | 11/2016 | Milum | |
| 2016/0379132 | A1 * | 12/2016 | Jin | H04L 67/22 706/12 |
| 2018/0018683 | A1 * | 1/2018 | Yee | G06Q 30/0202 |
| 2018/0158015 | A1 | 7/2018 | Ouyang et al. | |
| 2019/0005389 | A1 * | 1/2019 | Glyman | G06F 9/45558 |
| 2019/0080277 | A1 * | 3/2019 | Trivelpiece | G06K 9/00771 |
| 2019/0138975 | A1 | 5/2019 | Zuberi et al. | |
| 2019/0172012 | A1 * | 6/2019 | Roy | G06Q 10/06315 |
| 2019/0272497 | A1 | 9/2019 | Tingler et al. | |
| 2020/0042925 | A1 * | 2/2020 | Ramani | G06Q 10/06395 |
| 2020/0143313 | A1 * | 5/2020 | Ohlsson | G06N 7/005 |

FOREIGN PATENT DOCUMENTS

| | | |
|---|---|---|
| CN | 109064274 A | 12/2018 |
| KR | 101939106 B1 | 1/2019 |

OTHER PUBLICATIONS

Sung J. Shim, Aran Kumar, and Jianxin Roger Jiao, Computer simulation for reengineering the linens Delivery process with RFID in a hospital, IEEE Xplore Digital Library, 2016, [online], [retrieved on Dec. 16, 2019]. Retrieved from the Internet <https://ieeexplore.ieee.org/abstract/document/7854193>.

Jan Gerston, Mark Macleod, and C. Allan Jones, Efficient Water Use for Texans: Policies, Tools, and Management Strategies, tamu.edu, Sep. 2002, [online], [retrieved on Dec. 19, 2019]. Retrieved from the Internet <https://baktrust.library.tamu.edu/handle/1969.1/6140>.

Yuan-Yuan Jiao, Yi-Wen Zhen, and Roger J. Jiao, Hospital linens inventory control re-engineering based on RFID, IEEE Xplore Digital Library, 2008, [online], [retrieved on Dec. 9, 2019]. Retrieved from the Internet <https://ieeexplore.ieee.org/abstract/document/4670908>.

Sungpo Yi, Xu Li, and Tun-Min (Catherine) Jai, Hotel guests' perception of best green practices: A content analysis of online reviews, journals.sagepub.com, Mar. 14, 2016, [online], [retrieved on Dec. 19, 2019]. Retrieved from the Internet <https://journals.sagepub.com/doi/abs/10.1177/1467358416637251>.

Imran Rahman, Dennis Reynolds, and Stefani Svaren, How "green" are North American hotels? An exploration of low-cost adoption practices, ScienceDirect, International Journal of Hospitality Management, vol. 31, Issue 3, Sep. 2012 pp. 720-727, [online], [retrieved on Dec. 19, 2019]. Retrieved from the Internet <https://www.sciencedirect.com/science/article/abs/pii/S0278431911001526>.

Juan Jose Tari, Enrique Claver-Cortes, Jorge Pereira-Moliner, and Jose F. Molina-Azorin, Levels of quality and environmental management in the hotel industry: Their joint influence on firm performance, ScienceDirect, International Journal of Hospitality Management, vol. 29, Issue 3, Sep. 2010, pp. 500-510, [online], [retrieved on Dec. 19, 2019]. Retrieved from the Internet <https://www.sciencedirect.com/science/article/abs/pii/S0278431909001509>.

Kurt Hozak, Managerial Guidance for Applying RFID in the Tourism Industry, Interdisciplinary Journal of contemporary Research in Business, vol. 4, No. 2, Jun. 2012, 13 pages, United States.

Godwin-Charles Ogbeide, Perception of Green Hotels in the 21st Century, Journal of Tourism Insights, vol. 3, Issue 1, Article 1, Jul. 2012, 10 pages, United States.

Arun Kumar, and Shams Rahman, RFID-enabled process reengineering of closed-loop supply chains in the healthcare industry of Singapore, ScienceDirect, Journal of Cleaner Production, vol. 85, Dec. 15, 2014, pp. 382-394, [online], [retrieved on Dec. 18, 2019]. Retrieved from the Internet <https://www.sciencedirect/com/science/article/pii/S0959652614003928>.

Jaroslav Kadlec, Radek Kuchta, Radovan Novotny, and Ondrej Cozik, RFID Modular System for the Internet of Things (IoT), Industrial Engineering & Management, vol. 3, Issue 4, 2014, 7 pages, The Czech Republic.

* cited by examiner

INVENTORY MANAGEMENT SYSTEM

CROSS-REFERENCE TO RELATED APPLICATIONS

This application claims the benefit of U.S. Provisional Application Ser. No. 62/802,079, titled "IoT-Enabled Article Asset Tracking with API Integration," filed by Donald Ward, on Feb. 6, 2019.

This application incorporates the entire contents of the foregoing application(s) herein by reference.

TECHNICAL FIELD

Various embodiments relate generally to inventory management systems.

BACKGROUND

Inventory management plays an important role in most places. For example, for a restaurant, different amounts of different fruits, vegetables, and meats may be decided based on the restaurant manager's estimated sales volume of different products (e.g., different dishes). For the healthcare supply industry, the need of the medicine may vary based on, for example, the location of a pharmacy (e.g., a pharmacy located in northwest of America vs. a pharmacy located in southeast of America), the weather and the season (e.g., summer vs. winter), and/or the size of the pharmacy.

If products (e.g., medicine) sell well, such products may run out of stock due to improper inventory management. The above condition may then directly affect the sales volume of the products, and the profits of the business will decrease. On the contrary, if the products sell poorly, such products may be stocked up due to improper inventory management. Such a condition may affect, for example, cash flow management of the business, such that the operation of the business will be poor.

SUMMARY

Apparatus and associated methods relate to an inventory management system having a machine learning engine trained to (a) dynamically predict a demand amount of the inventory in response to a set of near-future data and (b) generate a signal to order the amount of inventory as needed. In an illustrative example, the machine learning engine may be trained by a hotel's historical room booking data, the hotel's historical occupancy data, and corresponding inventory consumption data stored in a database. Various embodiments may enable, for example, the hotel to have better management on the status of inventories at various stages. For example, sufficient inventory may be available. In addition, providing the proper amount of inventory may also advantageously reduce the cost spent on unused products.

Various embodiments may achieve one or more advantages. For example, by using the inventory management system, each hotel may advantageously optimize its inventory amount. Accordingly, the usage of the inventory management system may have numerous positive impacts on the environment. For example, due to less unnecessary washing and cleaning, the usage of water, electricity, and laundry detergent may be decreased. The amount of wastewater generated by the washing machine may also advantageously decreased. In addition, as the inventory amount may be optimized, the hotel may only need to reorder a smaller amount of inventory. Accordingly, the fuel consumption may be reduced, which may also reduce the exhausts generated by the trucks, for example. In some embodiments, as the management inventory system may provide a predicted inventory amount, the hotel may plan the reordering of the inventory in advance to make the inventory more sustainable in the supply chain. In some embodiments, the inventory management system may also be used in various industries. For example, restaurants, hospitals, and corporate offices may train the machine learning engine accordingly to use the trained machine learning engine to perform the prediction function to predict the amounts of various inventories.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1:
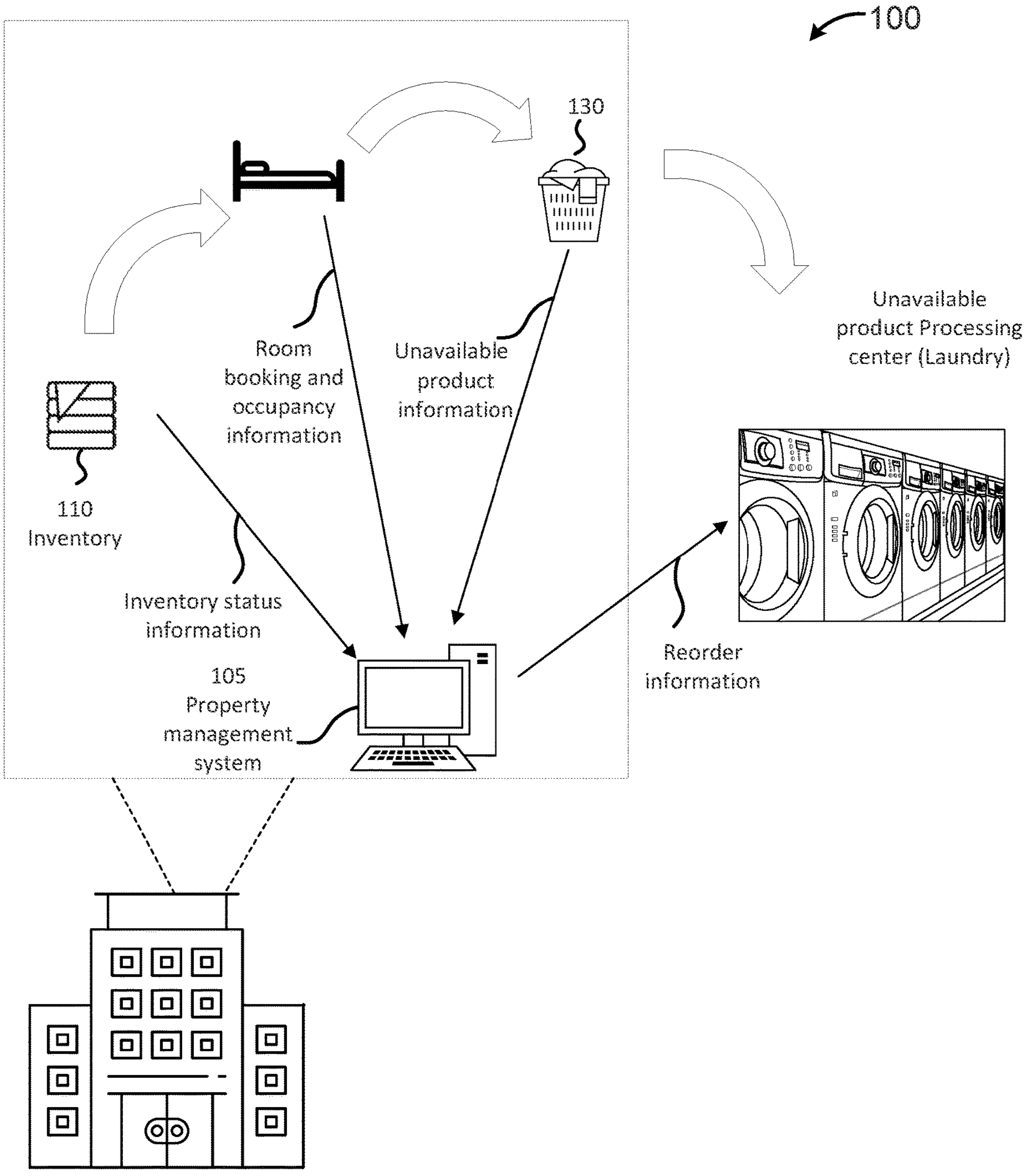
FIG. 1 depicts an exemplary property management system employed in an illustrative use-case scenario.

FIG. 1 depicts an exemplary property management system employed in an illustrative use-case scenario. Inventory management plays an important role in many places. In this depicted scenario 100, an exemplary property management system 105 is employed by, for example, a hotel, to manage the properties (e.g., room, linens) of the hotel. The property management system 105 may track the inventory status (e.g., categories and amounts of linens) and then decide whether to order extra linens based on, for example, the near-future (e.g., one-week, two-week, one-month) room booking information. By way of example, an embodiment of tracking the inventory status is described, with reference to [001]-[005] of the U.S. Provisional Application Ser. No. 62/802,079, titled "IoT-Enabled Article Asset Tracking with API" and filed by Donald Ward on Feb. 6, 2019, the entire content of which is incorporated here. By using the property management system 105, the hotel may have better management on the status of linens at various stages. For example, sufficient linen items may be available. In addition, the linens in the inventory storage closet or alcove may become, for example, damp and moldy after a period of time, and the hotel may not use those damp and moldy linens. Providing the proper amount of inventory may also advantageously reduce the cost spent on unused products (e.g., damp and moldy linens and expired foods).

In this depicted scenario 100, the property management system 105 is configured to monitor all properties of a hotel. The properties of the hotel may include, for example, inventories 110 (e.g., foods, and linens) and the hotel's rooms. The inventories' categories and amounts may be recorded and dynamically updated in the property management system 105. The room booking and occupancy data may also be monitored by the property management system

105. In this depicted example, after the linens are used, the used linens 130 may be sent to the outside laundry. The property management system 105 may order more linens when the stock of the linens is not enough. Whether the stock of the linens is enough is determined by a processing engine. An exemplary architecture of the processing engine will be discussed in detail with reference to FIG. 2.

Figure 2:
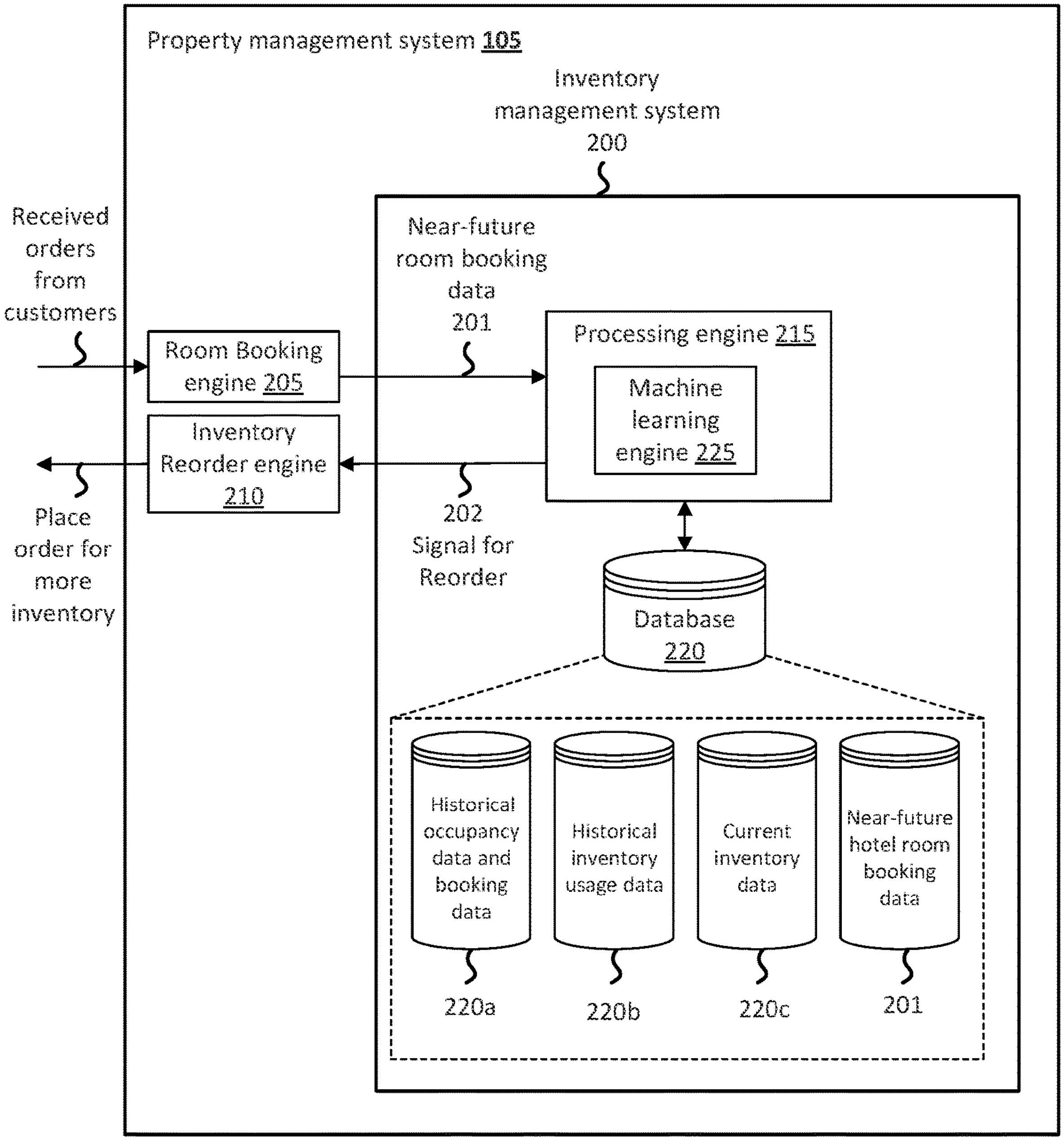
FIG. 2 depicts a block diagram of an exemplary property management system having an exemplary inventory management system.

FIG. 2 depicts a block diagram of an exemplary property management system having an exemplary inventory management system. In this depicted example, the property management system 105 includes an exemplary inventory management system 200 configured to monitor the current amount of the inventory 110, predict the amount of the inventory to be used in the near future, and generate a signal 202 to request for an extra amount of the inventory, if needed, in response to the hotel's near-future room booking data 201. The operations to be performed by the inventory management system 200 is discussed in further detail with reference to FIG. 4.

In this depicted example, the property management system 105 also includes a room booking engine 205, coupled to the inventory management system 200, configured to receive room booking orders from customers and generate the hotel's near-future room booking data 201. The property management system 105 also includes an inventory reorder engine 210, coupled to the inventory management system 200, configured to place orders to outside service providers (e.g., laundry) requesting for inventory supply in response to the signal 202 generated by the inventory management system 200.

The inventory management system 200 includes a processing engine 215 and a database 220 coupled to the processing engine 215 and containing a program of instructions that, when executed by the processing engine 215, cause the processing engine 215 to perform operations to predict the amount of inventory to be used by the hotel in the near future. The database 220 also includes different types of data related to the hotel. For example, the database 220 may include the hotel's historical room booking data and historical room occupancy data 220*a*. The database 220 also includes the hotel's historical inventory usage data. The database 220 also includes the hotel's current inventory data (e.g., current inventory categories and the corresponding amount of each category). The hotel's near-future booking data 201 may also be stored in the database 220.

The processing engine 215, in this predicted example, includes a machine learning engine 225. The machine learning engine 225 may be used to generate the signal 202 in response to the hotel's near-future booking data 201. An exemplary architecture of the machine learning engine is discussed in further detail with reference to FIG. 3. Exemplary operations to be performed by the processing engine will be discussed in further detail with reference to FIG. 4. By using the inventory management system 200, the hotel may have better management on the status of the inventory at various stages. For example, sufficient linen items may be available. Providing the proper amount of inventory may also advantageously reduce the cost spent on unused products (e.g., linens and expired food).

Figure 3:
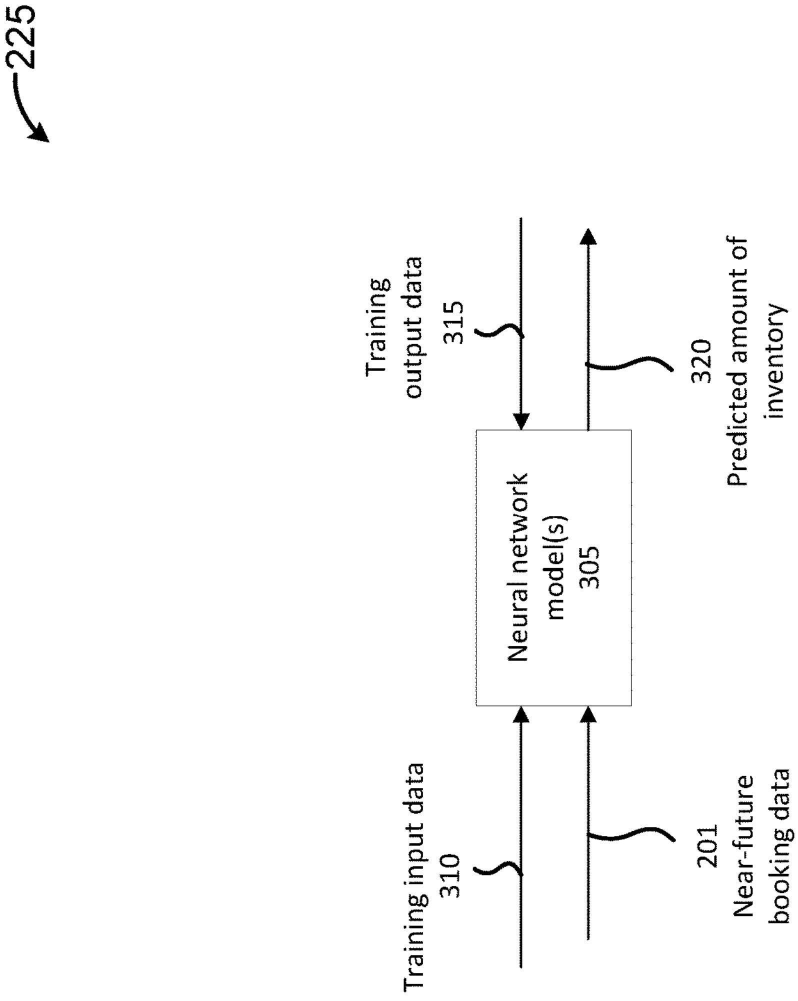
FIG. 3 depicts a block diagram of an exemplary machine learning engine implemented in the exemplary inventory management system.

FIG. 3 depicts a block diagram of an exemplary machine learning engine implemented in the exemplary inventory management system. In this depicted example, the machine learning engine 225 includes a neural network model 305. The neural network model 305 may include, for example, recurrent neural network (RNN) and/or deep neural network (DNN). Different neural network models may be selected. The number of the model layers (e.g., the hidden neurons) may also be determined based on, for example, the complexity of inventory and usage conditions. A set of training data is applied to the neural network model 305 to train the neural network model 305. The training data includes a set of training input data 310 and a set of training output data 315. The set of training input data 310 may include the hotel's historical booking data and occupancy data 220*a*. The set of training output data 315 may include the hotel's historical inventory usage data 220*b*. In some embodiments, before training, a set of testing data (including testing input data and testing output data) may be divided from the training data. After the neural network model 305 is trained, the testing data may be applied to the trained neural network model to test the training accuracy of the model. For example, the trained neural network model may receive the testing input data and generate an output data in response to the testing input data. The generated output data may be compared with the testing output data to determine the prediction accuracy. In some embodiments, one or more neural network models may be cascaded together. The cascaded model may be trained and tested.

Figure 4:
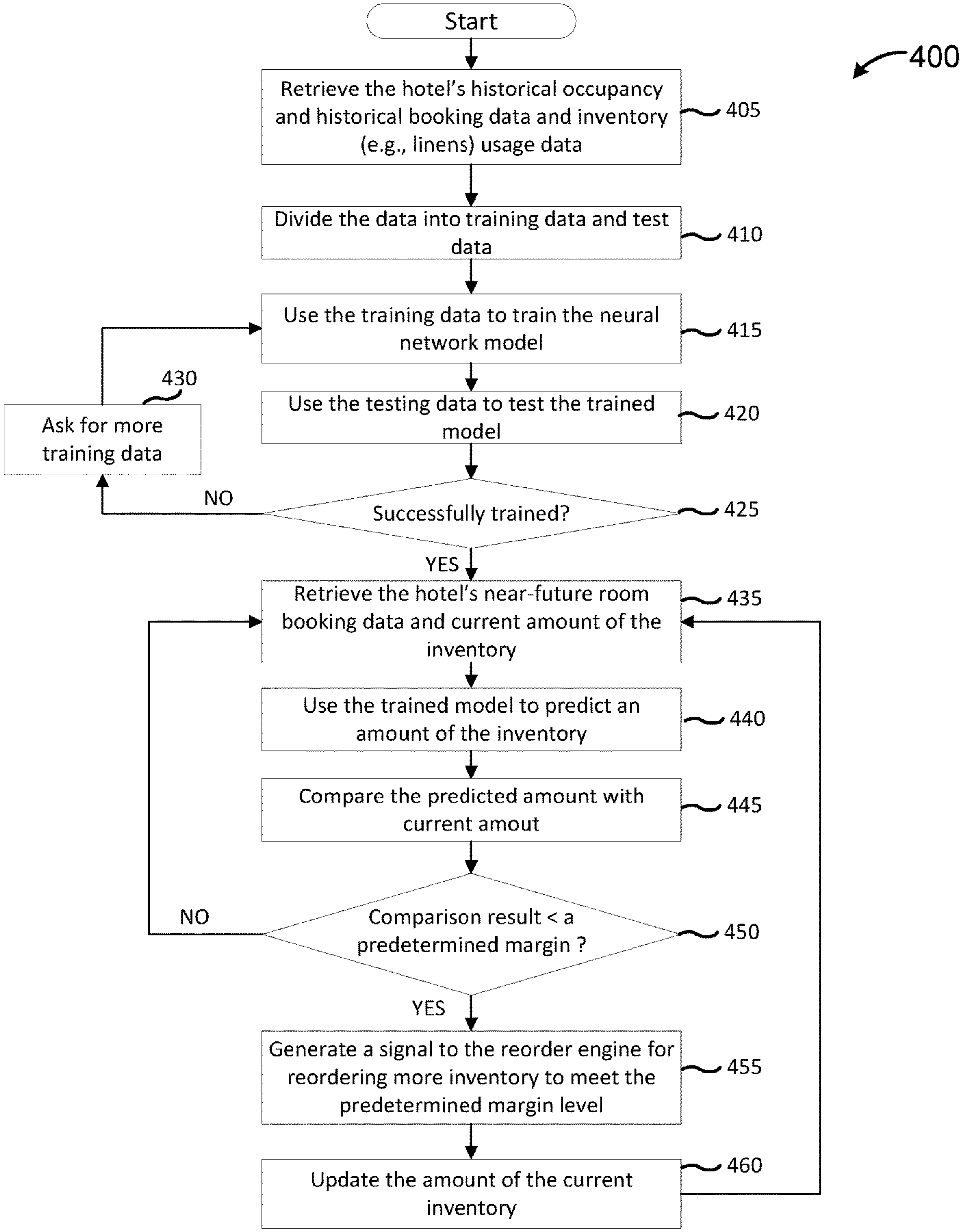
FIG. 4 depicts a flowchart of an exemplary method of managing inventory.

FIG. 4 depicts a flowchart of an exemplary method of managing inventory. An exemplary method 400 of managing inventory includes, at 405, retrieving (e.g., by the processing engine 215) the hotel's historical booking data and historical occupancy data 220*a* and corresponding inventory usage data 220*b*. The method 400 also includes, at 410, dividing the retrieved data into a first set of data used for training and a second set of data used for testing. The method 400 also includes, at 415, using the training data to train a neural network model. The method 400 also includes, at 420, applying the testing data to the trained neural network model and, at 425, determining whether the model is successfully trained. For example, if the difference between the actual output and the predicted output is within a predetermined range (e.g., 10, 15, 20), then the model may be regarded as successfully trained. If the difference is not within the predetermined range, then the model may be regarded as not successfully trained. And then, at 430, the processing engine may request for training data and the method 400 loops back to 415.

If the model was successfully trained, then the method 400 also includes, at 435, retrieving the hotel's near-future room booking data 201 and its current amount of the inventory 220*c*. The method 400 also includes, at 440, using the trained model to predict an inventory amount in response to the hotel's near-future room booking data. The method 400 also includes, at 445, comparing the predicted amount 320 (e.g., 80) of the inventory with the current amount 220*c* (e.g., 80) of the inventory. The method 400 also includes, at 450, determining whether the comparison result is less than a predetermined margin (e.g., 20). The predetermined margin may be set by the hotel. For example, each hotel may have its discretion. Different categories of inventory may also be assigned different predetermined margins. Providing the predetermined margin may advantageously improve the hotel's risk prevention ability.

If the comparison result is no less than the predetermined margin, then the method 400 loops back to 435 and the processing engine keeps monitoring the near-future hotel room booking data and the current amount of the inventory 220*c*. If the comparison result is less than the predetermined margin, then the method 400 includes, at 455, gendering a signal, for example, to the reorder engine to reorder more inventory as that the amount of the inventory is at a safety level. For example, the current amount of the queen-size sheet is 80, and the predetermined margin is 20 for the queen-size sheet (which means the safety stock amount of the queen-size sheet is 100). If the predicted amount (e.g., 90) of the queen-size sheet is less than 100, then, the processing engine may instruct the reorder engine to order ten queen-size sheets (such that the current amount of the queen-size sheet may be updated to 100). The method 400 also includes, at 460, updating the amount of the current inventory. By using the management inventory system, each hotel, for example, may advantageously optimize its inventory amount.

In one exemplary aspect, an inventory management system includes a processing engine a data store coupled to the processing engine. The data store contains a program of instructions that, when executed by the processing engine, cause the processing engine to perform operations to predict an amount of inventory to be used by a hospitality provider. The operations include (a) retrieving, by the processing engine, a first set of data from the data store, (b) training on a neural network model in response to the retrieved first set of data, and, (c) retrieving, by the processing engine, a second set of data from the data store and applying the second set of data to the trained neural network model to generate a predicted amount of inventory to be used. The first set of data used to train the neural network model includes historical booking data, and historical inventory usage data of the hospitality provider, and the second set of data includes the hospitality provider's near future booking data.

In some embodiments, the first set of data used to train the neural network model further may include the historical occupancy data of the hospitality provider. In some embodiments, the operations may include (d) comparing the predicted amount with the current amount of the inventory to generate a first comparison result, and, (e) when the first comparison result is negative, then, generating a signal to order more inventory such that the first comparison result will be zero. In some embodiments, the operations may include (f) comparing the predicted amount with the current amount of the inventory to generate a first comparison result, (g) comparing the first comparison result with a predetermined margin level to generate a second comparison result, and, (h) when the second comparison result is negative, then, generating a signal to order more inventory such that the second comparison result will be zero.

In some embodiments, the inventory may include linens. In some embodiments, the inventory may include food. In some embodiments, the hospitality provider may include hotels. In some embodiments, the hospitality provider may include hospitals. In some embodiments, the hospitality provider may include restaurants.

In another exemplary aspect, an inventory management system include a processing engine and a data store coupled to the processing engine. The data store contains a program of instructions that, when executed by the processing engine, cause the processing engine to perform operations to predict an amount of inventory to be used by a hospitality provider. The operations include (a) retrieving, by the processing engine, a first set of data from the data store, (b) training a neural network model in response to the retrieved first set of data, and, (c) retrieving, by the processing engine, a second set of data from the data store and applying the second set of data to the trained neural network model to generate a predicted amount of inventory to be used. The second set of data includes the hospitality provider's near future booking data.

In some embodiments, the operations may include (d) comparing the predicted amount with the current amount of the inventory to generate a first comparison result, and, (e) when the first comparison result is negative, then, generating a signal to order more inventory such that the first comparison result will be zero. In some embodiments, the operations may include (f) comparing the predicted amount with the current amount of the inventory to generate a first comparison result, (g) comparing the first comparison result with a predetermined margin level to generate a second comparison result, and, (h) when the second comparison result is negative, then, generating a signal to order more inventory such that the second comparison result will be zero. In some embodiments, the inventory may include linens. In some embodiments, the inventory may include food. In some embodiments, the hospitality provider may include hotels.

In another exemplary aspect, a method of managing inventory of a hospitality provider includes (a) retrieving, by a processing engine, a first set of data from the data store, (b) training a neural network model in response to the retrieved first set of data, and, (c) retrieving, by the processing engine, a second set of data from the data store and applying the second set of data to the trained neural network model to generate a predicted amount of inventory to be used. The first set of data used to train the neural network model includes historical booking data and historical inventory usage data of the hospitality provider. The second set of data comprises the hospitality provider's near future booking data.

In some embodiments, the method may include (d) comparing the predicted amount with the current amount of the inventory to generate a first comparison result, and, (e) when the first comparison result is negative, then, generating a signal to order more inventory such that the first comparison result will be zero. In some embodiments, the method may include (f) comparing the predicted amount with the current amount of the inventory to generate a first comparison result, (g) comparing the first comparison result with a predetermined margin level to generate a second comparison result, and, (h) when the second comparison result is negative, then, generating a signal to order more inventory such that the second comparison result will be zero. In some embodiments, the inventory may include linens. In some embodiments, the inventory may include food.

Although various embodiments have been described with reference to the figures, other embodiments are possible. For example, the inventory management system may also be used to provide guidance for new hotels. The new hotel's manager may input the hotel's information (e.g., facilities, location, size) into the inventory management system, and the inventory management system may then predict the amount of the inventory to be used by this new hotel based on other similar hotels.

In some embodiments, in addition to hotels, other businesses may also implement the inventory management system. For example, hospitals may implement the inventory management system. The hospitals may use the inventory management system to predict inventories related to, for example, linens and medicines. In this depicted example, the historical booking and occupancy data related to the hospital beds and related historical composition of the linens may be selected as training data. To predict the inventory amount of different medicines, the machine learning engine in the inventory management system may also be trained by, for example, the hospital's historical medicine consumption.

In some embodiments, restaurants may implement the inventory management system. For example, restaurants may use the restaurants may implement system to predict the amount and categories of vegetables to be procured. The restaurant's, for example, historical reservation data, historical revenue, and/or historical procurement data may be used to train the machine learning engine in the inventory management system.

In some embodiments, corporate offices may also implement the inventory management system. For example, a company may use the inventory management system to predict the amount of office supplies (e.g., pens, papers, staples) to be procured. The machine learning engine may be trained by, for example, the historical consumption amount of the office supplies and/or historical numbers of employees.

Short-term rentals may also implement the inventory management system. For example, short-term rental providers (e.g., Airbnb hosts) may use the inventory management system to predict the quantities of inventories (e.g., linens, toiletries) to be used in the near future. The prediction may be based on a trained machine learning engine. The machine learning engine may be trained based on, for example, the previous reservation data and the previous consumption of the inventory.

For example, some bypass circuits implementations may be controlled in response to signals from analog or digital components, which may be discrete, integrated, or a combination of each. Some embodiments may include programmed and/or programmable devices (e.g., PLAs, PLDs, ASICs, microcontroller, microprocessor), and may include one or more data stores (e.g., cell, register, block, page) that provide single or multi-level digital data storage capability, and which may be volatile and/or non-volatile. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an exemplary system 100 has been described with reference to FIG. 1, other implementations may be deployed in other industrial, scientific, medical, commercial, and/or residential applications.

Temporary auxiliary energy inputs may be received, for example, from chargeable or single use batteries, which may enable use in portable or remote applications. Some embodiments may operate with other DC voltage sources, such as a 9V (nominal) batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave, etc. . . . ) inputs may include a line frequency transformer to provide voltage step-up, voltage step-down, and/or isolation.

Although an example of a system, which may be portable, has been described with reference to the above figures, other implementations may be deployed in other processing applications, such as desktop and networked environments. Although particular features of an architecture have been described, other features may be incorporated to improve performance. For example, caching (e.g., L1, L2, etc. . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades, etc. . . . ), and the like. One or more communication interfaces may be provided in support of data storage and related operations.

Some systems may be implemented as a computer system that can be used with implementations of the invention. For example, various implementations may include digital and/or analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of the invention by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits).

In some implementations, each system 100 may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. The invention may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, the system 100 may communicate using suitable communication methods, equipment, and techniques. For example, the system 100 may communicate with compatible devices (e.g., devices capable of transferring data to and/or from the system 100) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits and/or other modules. In various examples, the modules may include analog and/or digital logic, discrete components, traces and/or memory circuits fabricated on a silicon substrate including various integrated circuits (e.g., FPGAs, ASICs). In some embodiments, the module(s) may involve execution of preprogrammed instructions and/or software executed by a processor. For example, various modules may involve both hardware and software.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. An inventory management system, comprising:

a processing engine; and, a data store coupled to the processing engine and containing a program of instructions that, when executed by the processing engine, cause the processing engine to perform operations to predict an amount of inventory to be used by a hospitality provider, the operations comprising:

(a) retrieving, by the processing engine, historical room booking data and corresponding subsequent historical linen inventory usage data of the hospitality provider from the data store;

(b) iteratively training a neural network model by applying the historical room booking data to the neural network model as training input data and applying the corresponding subsequent historical linen inventory usage data to the neural network model as a training output data prediction goal of the neural network model, the training continuing until the neural network model generates an algorithm configured to predict linen inventory usage data, in response to test historical room booking data, within a predetermined accuracy range of test linen inventory usage data corresponding to the test historical room booking data;

(c) retrieving, by the processing engine, near future room booking data of the hospitality provider from the data store and applying the near future room booking data to the trained neural network model, wherein the near future is defined at least by a minimum future time corresponding to a time required for ordering additional linen inventory; and, (d) generating as an output of the neural network model in response to the near future room booking data a predicted amount of linen inventory to be used during the near future based on the training of the neural network model using the historical room booking data and corresponding historical linen inventory usage data.

2. The inventory management system of claim 1, wherein:

data retrieved in (a) further includes historical occupancy data of the hospitality provider, the training input data used to train the neural network model in (b) further comprises historical occupancy data, and the predicted amount of linen inventory output by the neural network model in (d) is further based on the training of the neural network model using the historical occupancy data.

3. The inventory management system of claim 1, wherein the operations further comprise:

(e) comparing the predicted amount with a current amount of the linen inventory to generate a first comparison result; and, (f) when the first comparison result is negative, then, generating a signal to order more linen inventory such that the first comparison result will be zero.

4. The inventory management system of claim 1, wherein the operations further comprise:

(d) comparing the predicted amount with a current amount of the linen inventory to generate a first comparison result;

(e) comparing the first comparison result with a predetermined margin level to generate a second comparison result; and, (f) when the second comparison result is negative, then, generating a signal to order more linen inventory such that the second comparison result will be zero.

5. The inventory management system of claim 1, wherein the historic linen inventory usage data further comprises historic food inventory usage data, and wherein the predicted amount of linen inventory further comprises a predicted amount of food inventory.

6. The inventory management system of claim 1, wherein the hospitality provider comprises hotels.

7. The inventory management system of claim 1, wherein the hospitality provider comprises hospitals.

8. The inventory management system of claim 1, wherein the hospitality provider comprises restaurants.

9. An inventory management system, comprising:

a processing engine; and, a data store coupled to the processing engine and containing a program of instructions that, when executed by the processing engine, cause the processing engine to perform operations to predict an amount of inventory to be used by a hospitality provider, the operations comprising:

(a) retrieving, by the processing engine, historical room booking data of the hospitality provider and corresponding subsequent historical linen inventory usage data from the data store;

(b) iteratively training a neural network model by applying the historical room booking data to the neural network model as training input data and applying the corresponding subsequent historical linen inventory usage data to the neural network model as training output data until predicted linen inventory usage data generated by the neural network model in response to test historical room booking data is within a predetermined accuracy range of test linen inventory usage data corresponding to the test historical room booking data;

(c) retrieving, by the processing engine, near future room booking data of the hospitality provider from the data store and applying the near future room booking data to the trained neural network model, wherein the near future is defined at least by a minimum future time corresponding to a time required for ordering additional linen inventory; and, (d) generating as an output of the neural network model in response to the near future room booking data a predicted amount of linen inventory to be used during the near future based on the training of the neural network model using the historical room booking data and corresponding historical linen inventory usage data.

10. The inventory management system of claim 9, wherein the operations further comprise:

(e) comparing the predicted amount with a current amount of the linen inventory to generate a first comparison result; and, (f) when the first comparison result is negative, then, generating a signal to order more linen inventory such that the first comparison result will be zero.

11. The inventory management system of claim 9, wherein the operations further comprise:

(e) comparing the predicted amount with a current amount of the linen inventory to generate a first comparison result;

(f) comparing the first comparison result with a predetermined margin level to generate a second comparison result; and, (g) when the second comparison result is negative, then, generating a signal to order more linen inventory such that the second comparison result will be zero.

12. The inventory management system of claim 9, wherein the historic linen inventory usage data further comprises historic food inventory usage data, and wherein the predicted amount of linen inventory further comprises a predicted amount of food inventory.

13. The inventory management system of claim 9, wherein iteratively training the neural network model comprises:

(a1) dividing both the historical room booking data and the corresponding historical linen inventory usage data into: (i) a training set for use in training the neural network model in (b), and (ii) a testing set; and, (b1) after training the neural network model, testing the trained neural network model by: (i) applying the historical room booking data of the testing set to the trained neural network model, (ii) generating as a resulting output from the neural network model a test linen inventory usage prediction, (iii) comparing the test linen inventory usage prediction to the historical linen inventory usage data of the testing set, and (iv) determining the predicted linen inventory usage prediction accuracy of the trained neural network model based on the comparison.

14. A method of managing inventory of a hospitality provider, the method comprising:

(a) retrieving, by a processing engine, historical room booking data and corresponding subsequent historical linen inventory usage data of the hospitality provider from the data store;

(b) iteratively training a neural network model by applying the historical room booking data to the neural network model as training input data and applying the corresponding subsequent historical linen inventory usage data to the neural network model as training output data until predicted linen inventory usage data is within a predetermined accuracy range of test linen inventory usage data corresponding to the test historical room booking data;

(c) retrieving, by the processing engine, near future room booking data of the hospitality provider from the data store and applying the near future room booking data to the trained neural network model, wherein the near future is defined at least by a minimum future time corresponding to a time required for ordering additional linen inventory; and, (d) generating as an output of the neural network model in response to the near future room booking data a predicted amount of linen inventory to be used during the near future based on the training of the neural network model using the historical room booking data and corresponding historical linen inventory usage data.

15. The method of claim 14, further comprising:

(e) comparing the predicted amount with a current amount of the linen inventory to generate a first comparison result; and, (f) when the first comparison result is negative, then, generating a signal to order more linen inventory such that the first comparison result will be zero.

16. The method of claim 14, further comprising:

(e) comparing the predicted amount with a current amount of the linen inventory to generate a first comparison result;

(f) comparing the first comparison result with a predetermined margin level to generate a second comparison result; and, (g) when the second comparison result is negative, then, generating a signal to order more linen inventory such that the second comparison result will be zero.

17. The method of claim 14, wherein the historic linen inventory usage data further comprises historic food inventory usage data, and wherein the predicted amount of linen inventory further comprises a predicted amount of food inventory.

* * * * *